United States Patent
Zhou et al.

(10) Patent No.: US 8,231,785 B2
(45) Date of Patent: *Jul. 31, 2012

(54) STAGED MEMBRANE SYSTEM FOR GAS, VAPOR, AND LIQUID SEPARATIONS

(75) Inventors: Lubo Zhou, Inverness, IL (US); Chunqing Liu, Schaumburg, IL (US); Carlos A. Cabrera, Northbrook, IL (US); Peter K. Coughlin, Mundelein, IL (US)

(73) Assignee: UOP LLC, Des Plaines, IL (US)

( * ) Notice: Subject to any disclaimer, the term of this patent is extended or adjusted under 35 U.S.C. 154(b) by 295 days.

This patent is subject to a terminal disclaimer.

(21) Appl. No.: 12/464,394

(22) Filed: May 12, 2009

(65) Prior Publication Data
US 2010/0288701 A1    Nov. 18, 2010

(51) Int. Cl.
*B01D 61/36* (2006.01)
*B01D 71/62* (2006.01)
*B01D 53/22* (2006.01)
*B01D 63/00* (2006.01)

(52) U.S. Cl. .......... 210/640; 210/653; 210/500.39; 210/641; 96/14; 95/45

(58) Field of Classification Search .......... None
See application file for complete search history.

(56) References Cited

U.S. PATENT DOCUMENTS

| | | | |
|---|---|---|---|
| 3,133,132 A | 5/1964 | Loeb et al. | |
| 3,246,450 A * | 4/1966 | Stern et al. | 95/55 |
| 4,130,403 A * | 12/1978 | Cooley et al. | 95/49 |
| 4,230,463 A | 10/1980 | Henis et al. | |
| 4,855,048 A | 8/1989 | Tang et al. | |
| 4,877,528 A | 10/1989 | Friesen et al. | |
| 4,944,094 A * | 7/1990 | Depiano et al. | 33/371 |
| 5,034,026 A | 7/1991 | Summers et al. | |
| 5,066,769 A | 11/1991 | Evers et al. | |
| 5,409,524 A | 4/1995 | Jensvold et al. | |
| 5,482,539 A | 1/1996 | Callahan | |
| 5,492,666 A | 2/1996 | Wang et al. | |
| 5,679,133 A | 10/1997 | Moll et al. | |
| 5,837,032 A | 11/1998 | Moll et al. | |
| 5,873,928 A | 2/1999 | Callahan | |
| 6,368,382 B1 | 4/2002 | Chiou | |

(Continued)

FOREIGN PATENT DOCUMENTS

WO    WO 91/16123 A1    10/1991

(Continued)

OTHER PUBLICATIONS

U.S. Appl. No. 12/412,629, filed Mar. 27, 2009, Liu et al.

(Continued)

*Primary Examiner* — Krishnan S Menon
(74) *Attorney, Agent, or Firm* — Mark Goldberg

(57) ABSTRACT

The present invention involves the use of a multi-stage membrane system for gas, vapor, and liquid separations. In this multi-stage membrane system, high selectivity and high permeance or at least high selectivity polybenzoxazole membranes or cross-linked polybenzoxazole membranes are applied for a pre-membrane or both the pre-membrane and the secondary membrane. A primary membrane can be from conventional glassy polymers. This multi-stage membrane system can reduce inter-stage compression cost, increase product recovery and product purity for gas, vapor, and liquid separations. It can also save the cost compared to the system using all the high cost polybenzoxazole membranes or cross-linked polybenzoxazole membranes.

10 Claims, 2 Drawing Sheets

U.S. PATENT DOCUMENTS

| | | |
|---|---|---|
| 7,368,216 B2 | 5/2008 | Sato et al. |
| 7,407,731 B2 | 8/2008 | Naiini et al. |
| 2006/0069227 A1 | 3/2006 | Sugo et al. |

FOREIGN PATENT DOCUMENTS

| | | |
|---|---|---|
| WO | WO 2006/080766 A1 | 8/2006 |

OTHER PUBLICATIONS

U.S. Appl. No. 12/412,633, filed Mar. 27, 2009, Liu et al.
U.S. Appl. No. 12/412,639, filed Mar. 27, 2009, Liu et al.
U.S. Appl. No. 12/412,643, filed Mar. 27, 2009, Liu et al.
U.S. Appl. No. 12/412,647, filed Mar. 27, 2009, Liu et al.
U.S. Appl. No. 12/412,649, filed Mar. 27, 2009, Liu et al.
U.S. Appl. No. 12/412,653, filed Mar. 27, 2009, Liu et al.
Ho Bum Park et al., "Polymers with Cavities Tuned for Fast Selective Transport of Small Molecules and Ions", Science, Oct. 12, 2007, vol. 318, pp. 255-258.
Kwang-Je Kim et al., "Preparation of 6FDA-Based Polyimide Membranes for $CO_2$ Gas Separation", Studies in Surface Science and Catalysis 153, pp. 531-534, 2004.
Ho Bum Park et al., "Relationship Between Chemical Structure of Aromatic Polyimides and Gas Permeation Properties . . . ", Journal of Membrane Science 229 (2004) 117-127.

\* cited by examiner

STAGED MEMBRANE SYSTEM FOR GAS, VAPOR, AND LIQUID SEPARATIONS

BACKGROUND OF THE INVENTION

The present invention involves the use of a multi-stage membrane system for gas, vapor, and liquid separations. This membrane system can reduce inter-stage compression cost, increase product recovery and product purity for gas, vapor, and liquid separations. In this configuration, two types of membranes will be used. One is a membrane with both high selectivity and high permeance or at least high selectivity, which is at least greater than 20, preferably greater than 30, but the cost of manufacturing such a membrane is relatively high. The other membrane is the commercially available membrane with lower selectivity.

Multi-stage membranes are used to increase the product recovery or the product purity for commercial application. For example, in a conventional two-stage membrane system to recover the useful product, a permeate that passes through the primary membrane will be compressed and then will pass through the secondary membrane. The residue from the secondary membrane is then recycled to the primary membrane. This two-stage membrane configuration can significantly increase the product recovery compared to a one-stage membrane system. The two-stage system can also be used to obtain high purity permeate product. However, the required compressor power is generally high since the permeate from the primary membrane is compressed in this process configuration.

It is important to reduce the compression cost while maintaining the level of product recovery in any new configuration. In the present invention, a preliminary membrane (referred to herein as a "pre-membrane") with both high selectivity and high permeance or at least one with high selectivity, which is at least greater than 20, preferably greater than 30, is used. The permeate from the pre-membrane will not be compressed and sent to the secondary membrane, but instead, it will be directly sent to either the waste stream or product stream. Since the selectivity of the pre-membrane unit is very high, the membrane will provide either low product (as retentate) loss, or high purity product (as permeate).

It is further desirable to increase the retentate product recovery and/or permeate product purity by applying the high selectivity and high permeance or at least high selectivity, which is at least greater than 20, preferably greater than 30, membrane as both the pre-membrane and the secondary membrane in the proposed membrane system configuration. Since the pre-membrane area and the second-stage membrane area are relatively small compared to that of the primary membrane, the new membrane system will not significantly increase the cost of whole system even the high cost membranes are used for the pre-membrane and secondary membrane.

Preferably the membrane materials for the pre-membrane and secondary membrane of the multi-stage membrane system in the present invention are selected from polybenzoxazole polymers and cross-linked polybenzoxazole polymers that have both high selectivity and high permeability or have at least high selectivity.

A recent publication in the journal SCIENCE reported on a new type of high permeability polybenzoxazole polymer membrane for gas separations (Ho Bum Park et al, SCIENCE 318, 254 (2007)). These polybenzoxazole membranes are prepared from high temperature thermal rearrangement of polyimide polymer membranes containing pendent hydroxyl groups ortho to the heterocyclic imide nitrogen. These polybenzoxazole polymer membranes exhibited extremely high $CO_2$ permeability (>1000 Barrer) for $CO_2/CH_4$ separation. These polybenzoxazole polymer membranes have very good thermal stability at elevated temperature.

SUMMARY OF THE INVENTION

The present invention uses high performance polybenzoxazole polymer and cross-linked polybenzoxazole polymer membranes that are different from the prior art. These new membranes have easy processability, high selectivity, high permeability, high thermal stability, and high resistance to solvent swelling, plasticization and hydrocarbon contaminants.

The present invention applies this new type of membranes as the pre-membrane and secondary membrane, and succeeding stages in a multi-stage membrane system.

The present invention involves a process for separating a mixture of gases or liquids comprising sending said mixture of gases or liquids to a pre-membrane unit to separate them into a first permeate stream passing through the membrane within said pre-membrane unit and a first retentate stream that does not pass through said pre-membrane unit wherein said pre-membrane unit comprises a membrane with both high selectivity and high permeance or at least high selectivity, which is at least greater than 20, preferably greater than 30; sending said first retentate stream to a primary membrane unit to separate said first retentate stream into a second permeate stream and a second retentate stream wherein the primary membrane unit comprises at least one glassy polymer membrane; and then sending the second permeate stream to a secondary membrane unit to separate it into a third permeate stream and a third retentate stream wherein the secondary membrane unit comprises at least one glassy polymer membrane.

The present invention also involves a system for separation of mixtures of gases or liquids comprising a pre-membrane unit, a primary membrane unit and a secondary membrane unit wherein said pre-membrane unit comprises a membrane with both high selectivity and high permeance or at least high selectivity, which is at least greater than 20, preferably greater than 30, and said primary membrane unit and secondary membrane unit comprise at least one glassy polymer and wherein a liquid or gas mixture is separated into a retentate stream and a permeate stream by each of said pre-membrane unit, said primary membrane unit and said secondary membrane unit in sequence. The both high selectivity and high permeance or at least high selectivity membrane comprises at least one polybenzoxazole polymer membrane or at least one crosslinked polybenzoxazole polymer membrane.

DETAILED DESCRIPTION OF THE INVENTION

Figure 1:
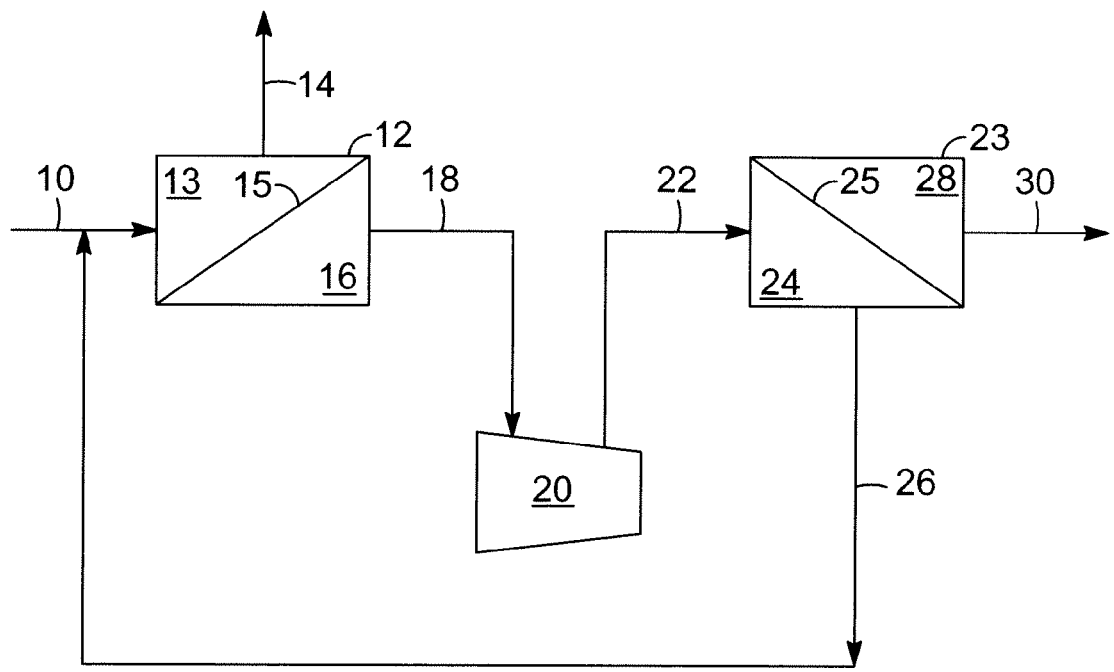
FIG. 1 shows a conventional two stage-membrane system with the retentate as the product.

The present invention involves the use of a multi-stage membrane system for gas, vapor, and liquid separations. In this multi-stage membrane system, high selectivity and high permeance or at least high selectivity membranes, which have selectivity at least greater than 20, preferably greater than 30, are applied for the pre-membrane and secondary membrane. This multi-stage membrane system can reduce inter-stage compression cost, increase product recovery and product purity for gas and vapor separations. It can also save the cost compared to a system using all high cost polybenzoxazole membranes or cross-linked polybenzoxazole membranes. The both high selectivity and high permeance or at least high selectivity membrane comprises at least one polybenzoxazole polymer membrane or at least one crosslinked polybenzoxazole polymer membrane. The polybenzoxazole-type of polymer materials as reported in the literature (see Ho Bum Park et al, SCIENCE, 318, 254 (2007)) are selected as one of the membrane materials to make the membrane for the pre-membrane and secondary membrane in the multi-stage membrane system and process in the present invention. The polybenzoxazole-type of polymer materials used in the present invention can be prepared from thermal conversion of any hydroxy-containing polyimides with pendent hydroxyl groups ortho to the heterocyclic imide nitrogen upon heating between 250° C. and 600° C. under inert atmosphere such as nitrogen or vacuum. The thermal conversion is accompanied by loss of carbon dioxide and no other volatile byproducts are generated. These hydroxy-containing polyimide polymers comprise a plurality of first repeating units of a formula (I), wherein said formula (I) is:

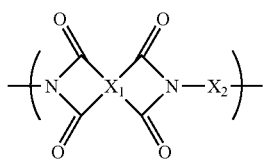

where $X_1$ of formula (I) is selected from the group consisting of

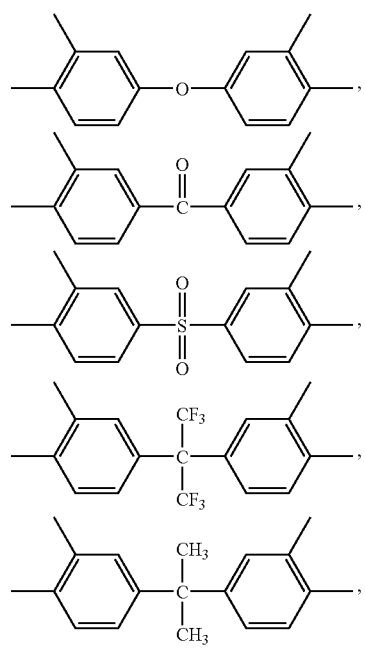

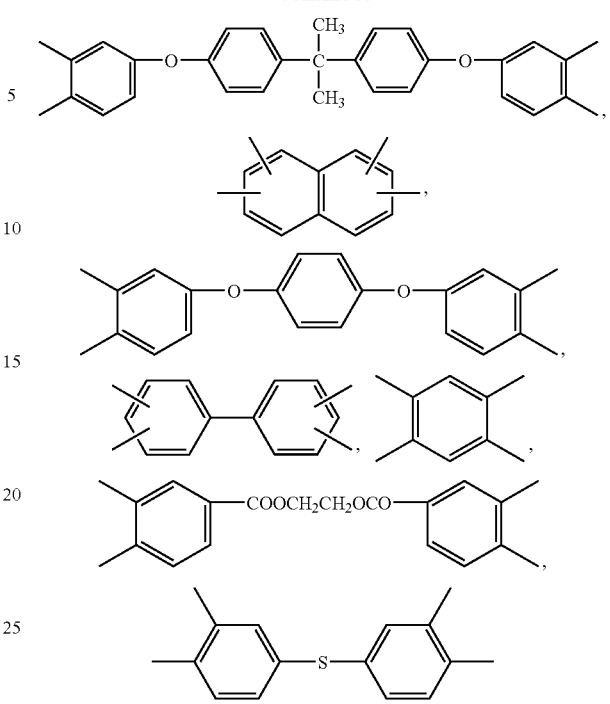

and mixtures thereof, —$X_2$— of formula (I) is selected from the group consisting of

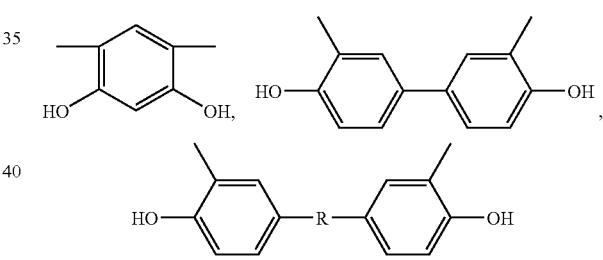

and mixtures thereof, and —R— is selected from the group consisting of

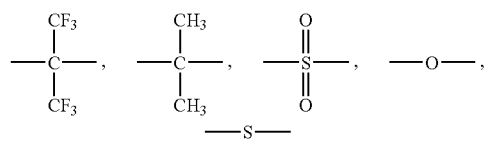

and mixtures thereof.

It is preferred that $X_1$ group of formula (I) is selected from the group consisting of

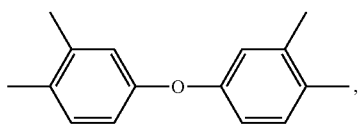

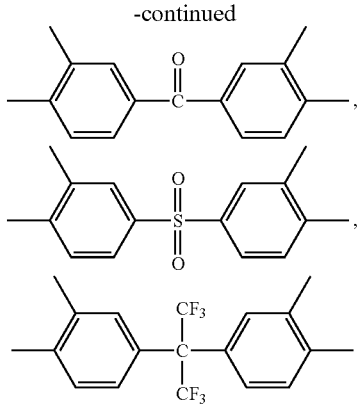

and mixtures thereof.

It is preferred that —$X_2$— group of formula (I) is selected from the group consisting of

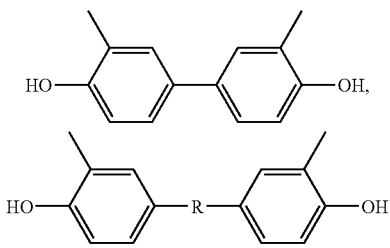

and mixtures thereof, and it is preferred that —R— group is represented by the formula:

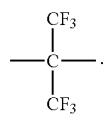

Some preferred hydroxy-containing polyimide polymers that are used in the present invention include, but are not limited to, poly[2,2'-bis-(3,4-dicarboxyphenyl) hexafluoropropane dianhydride-2,2-bis(3-amino-4-hydroxyphenyl)-hexafluoropropane] (poly(6FDA-APAF)), poly[3,3',4,4'-benzophenonetetracarboxylic dianhydride-2,2-bis(3-amino-4-hydroxyphenyl)-hexafluoropropane] (poly(BTDA-APAF)), poly(3,3',4,4'-benzophenonetetracarboxylic dianhydride-3,3'-dihydroxy-4,4'-diamino-biphenyl) (poly(BTDA-HAB)), poly[4,4'-oxydiphthalic anhydride-2,2-bis(3-amino-4-hydroxyphenyl)-hexafluoropropane] (poly(ODPA-APAF)), poly[3,3',4,4'-diphenylsulfone tetracarboxylic dianhydride-2,2-bis(3-amino-4-hydroxyphenyl)-hexafluoropropane] (poly(DSDA-APAF)), poly(3,3',4,4'-diphenylsulfone tetracarboxylic dianhydride-2,2-bis(3-amino-4-hydroxyphenyl)-hexafluoropropane-3,3'-dihydroxy-4,4'-diamino-biphenyl) (poly(DSDA-APAF-HAB)), poly[2,2'-bis-(3,4-dicarboxyphenyl) hexafluoropropane dianhydride-3,3',4,4'-benzophenonetetracarboxylic dianhydride-2,2-bis(3-amino-4-hydroxyphenyl)-hexafluoropropane] (poly(6FDA-BTDA-APAF)), poly[4,4'-oxydiphthalic anhydride-2,2-bis(3-amino-4-hydroxyphenyl)-hexafluoropropane-3,3'-dihydroxy-4,4'-diamino-biphenyl] (poly(ODPA-APAF-HAB)), poly[3,3',4,4'-benzophenonetetracarboxylic dianhydride-2,2-bis(3-amino-4-hydroxyphenyl)-hexafluoropropane-3,3'-dihydroxy-4,4'-diamino-biphenyl] (poly(BTDA-APAF-HAB)), poly[2,2'-bis-(3,4-dicarboxyphenyl) hexafluoropropane dianhydride-3,3'-dihydroxy-4,4'-diamino-biphenyl] (poly(6FDA-HAB)), and poly(4,4'-bisphenol A dianhydride-3,3',4,4'-benzophenonetetracarboxylic dianhydride-2,2-bis(3-amino-4-hydroxyphenyl)-hexafluoropropane] (poly(BPADA-BTDA-APAF)).

The hydroxy-containing polyimide polymers with pendent hydroxyl groups ortho to the heterocyclic imide nitrogen that are used for the preparation of the polybenzoxazole-type of membrane as the pre-membrane and secondary membrane in the multi-stage membrane process in the present invention are synthesized from diamines and dianhydrides in polar solvents such as 1-methyl-2-pyrrolidone (NMP) or N,N-dimethylacetamide (DMAc) by a two-step process involving the formation of the poly(amic acid)s followed by a solution imidization or a thermal imidization. Acetic anhydride is a preferred dehydrating agent and pyridine (or triethylamine) is a preferred imidization catalyst for the solution imidization reaction as described in the examples herein. Then, a polyimide membrane is prepared from the hydroxy-containing polyimide polymer in any convenient form such as sheet, disk, thin film composite, tube, or hollow fiber. The polybenzoxazole-type of membrane as the pre-membrane and secondary membrane in the multi-stage membrane process in the present invention is prepared from thermal conversion of the hydroxy-containing polyimide membrane upon heating between 250° and 600° C. under inert atmosphere such as nitrogen or vacuum. For example, polybenzoxazole membranes can be prepared from a hydroxyl-containing polyimide (poly[2,2'-bis-(3,4-dicarboxyphenyl) hexafluoropropane dianhydride-2,2-bis(3-amino-4-hydroxyphenyl)-hexafluoropropane], poly(6FDA-APAF)) membrane via a high temperature heat treatment at 400° C. and 450° C., respectively. The poly(6FDA-APAF) polyimide polymer was synthesized from solution condensation of 2,2-bis(3-amino-4-hydroxyphenyl)-hexafluoropropane diamine monomer (Bis-APAF) and 2,2'-bis-(3,4-dicarboxyphenyl) hexafluoropropane dianhydride monomer (6FDA).

The polybenzoxazole-type of membranes used as the pre-membrane and secondary membrane in the multi-stage membrane process in the present invention can be fabricated into any convenient form such as sheet, disk, tube, or hollow fiber. These membranes can also be fabricated into thin film composite membranes incorporating a selective thin polybenzoxazole layer and a porous supporting layer comprising a different polymer material or an inorganic material.

Another type of membrane that may be used as the pre-membrane and secondary membrane in the multi-stage membrane process in the present invention is a new type of cross-linked polybenzoxazole polymer membrane. The cross-linked polybenzoxazole polymer membrane as the pre-membrane and the secondary membrane in the multi-stage membrane process in the present invention is prepared from cross-linkable polyimide polymers comprising both UV cross-linkable functional groups in the polymer backbone and pendent hydroxyl groups ortho to the heterocyclic imide nitrogen via thermal conversion followed by UV radiation. The cross-linked polybenzoxazole polymer membranes described in the current invention comprise polybenzoxazole polymer chain segments wherein at least a part of these polymer chain segments are cross-linked to each other through possible direct covalent bonds by exposure to UV radiation or other crosslinking process. The cross-linking of the polybenzoxazole polymer membranes provides the membranes with significantly improved membrane selectivity and chemical and thermal stabilities.

The cross-linked polybenzoxazole polymer membranes as the pre-membrane and secondary membrane in the multi-stage membrane process in the present invention are prepared by: 1) first synthesizing both hydroxy- and UV cross-linkable functional group-containing polyimide polymer comprising pendent hydroxyl groups ortho to the heterocyclic imide nitrogen and UV cross-linkable functional groups in the polymer backbone; 2) fabricating a polyimide membrane from the hydroxy- and UV cross-linkable functional group-containing polyimide polymer; 3) converting the polyimide membrane to polybenzoxazole membrane by heating between 250° and 600° C. under inert atmosphere such as nitrogen or vacuum; and 4) finally converting the polybenzoxazole membrane to new cross-linked polybenzoxazole polymer membrane by UV radiation. In some cases a membrane post-treatment step can be added after step 4) by coating the top surface of the cross-linked polybenzoxazole polymer membrane with a thin layer of high permeability material such as a polysiloxane, a fluoro-polymer, a thermally curable silicone rubber, or a UV radiation curable epoxy silicone.

The polybenzoxazole-type of polymer membranes used in the present invention for the preparation of the cross-linked polybenzoxazole polymer membranes can be prepared from thermal conversion of both hydroxy- and UV cross-linkable functional group-containing polyimides with UV cross-linkable functional groups in the polymer backbone and pendent hydroxyl groups ortho to the heterocyclic imide nitrogen upon heating between 250 and 600° C. under nitrogen or vacuum. The thermal conversion is accompanied by loss of carbon dioxide and no other volatile byproducts are generated.

The both hydroxy- and UV cross-linkable functional group-containing polyimide polymers that are used for the preparation of the cross-linked polybenzoxazole-type of membrane as the pre-membrane and secondary membrane in the multi-stage membrane process in the present invention comprises a plurality of first repeating units of a formula (II), wherein said formula (II) is:

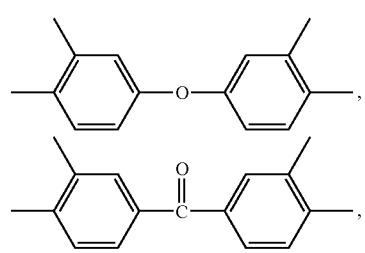

(II)

where X3 of formula (II) is

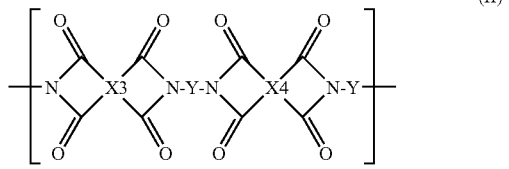

or mixtures thereof, X4 of formula (II) is either the same as X3 or is selected from

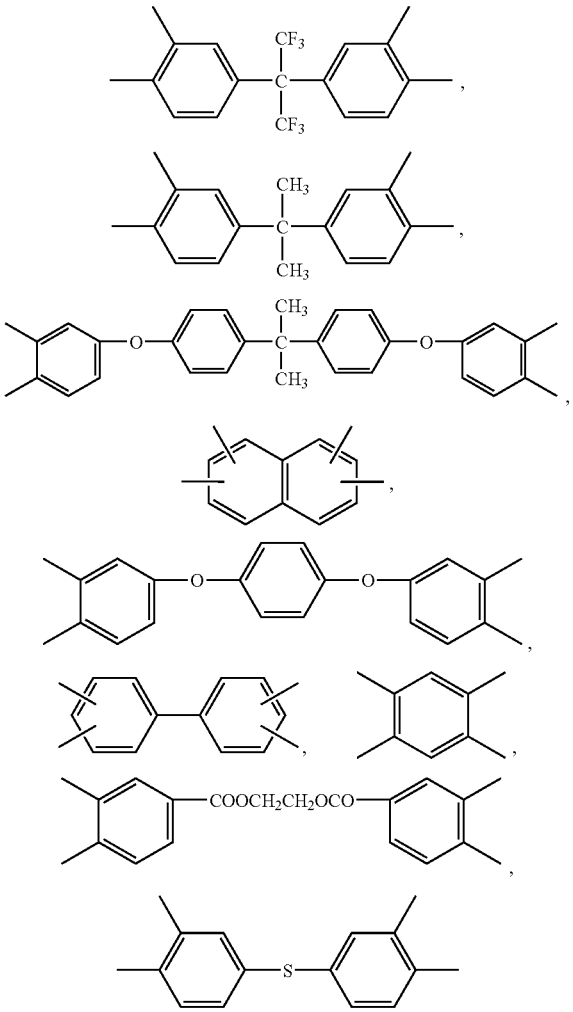

or mixtures thereof, —Y— of formula (II) is

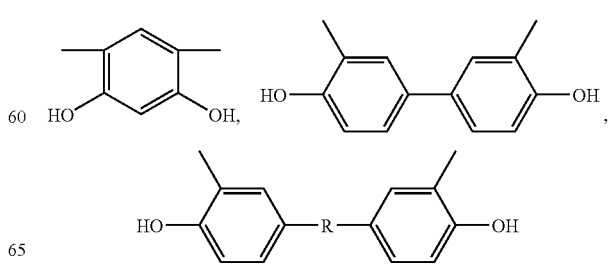

or mixtures thereof, —R— is

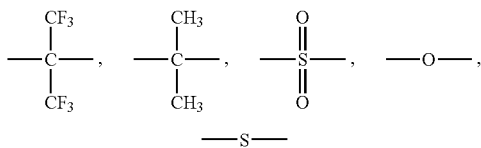

or mixtures thereof.

In one embodiment of the invention, when the preferred X3 and X4 of formula (II) are the same, they are selected from the group of:

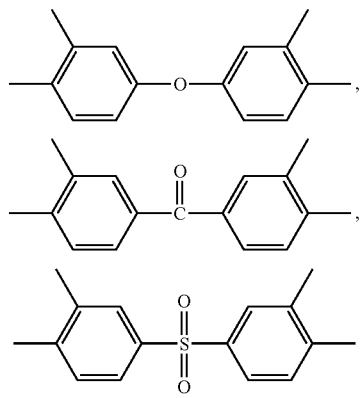

or mixtures thereof.

In another embodiment of the invention, X3 of formula (II) is selected from the group of:

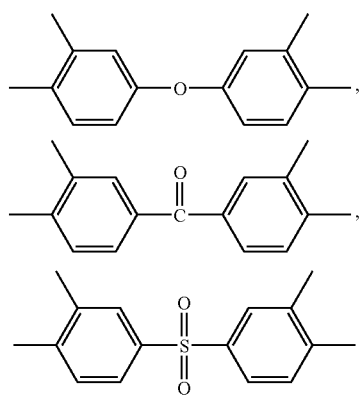

or mixtures thereof, X4 of said formula (II) is selected from the group of:

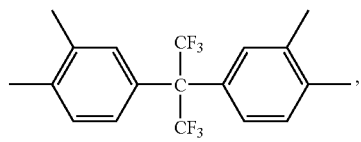

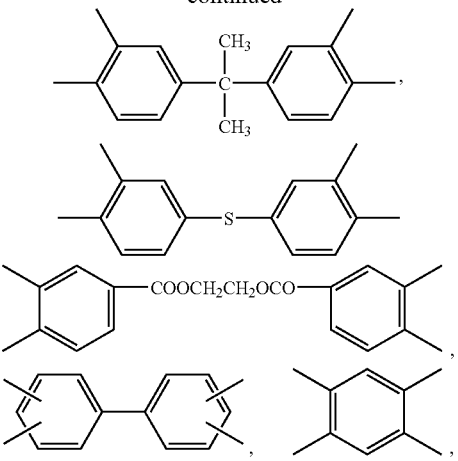

or mixtures thereof.

Some of the preferred both hydroxy- and UV cross-linkable functional group-containing polyimide polymers that are used for the preparation of the cross-linked polybenzoxazole-type of membrane as the pre-membrane and secondary membrane in the multi-stage membrane process in the present invention include, but are not limited to, poly[3,3',4,4'-benzophenonetetracarboxylic dianhydride-2,2-bis(3-amino-4-hydroxyphenyl)-hexafluoropropane] (poly(BTDA-APAF)), poly[4,4'-oxydiphthalic anhydride-2,2-bis(3-amino-4-hydroxyphenyl)-hexafluoropropane] (poly(ODPA-APAF)), poly(3,3',4,4'-benzophenonetetracarboxylic dianhydride-3,3'-dihydroxy-4,4'-diamino-biphenyl) (poly(BTDA-HAB)), poly[3,3',4,4'-diphenylsulfone tetracarboxylic dianhydride-2,2-bis(3-amino-4-hydroxyphenyl)-hexafluoropropane] (poly(DSDA-APAF)), poly(3,3',4,4'-diphenylsulfone tetracarboxylic dianhydride-2,2-bis(3-amino-4-hydroxyphenyl)-hexafluoropropane-3,3'-dihydroxy-4,4'-diamino-biphenyl) (poly(DSDA-APAF-HAB)), poly[2,2'-bis-(3,4-dicarboxyphenyl) hexafluoropropane dianhydride-3,3',4,4'-benzophenonetetracarboxylic dianhydride-2,2-bis(3-amino-4-hydroxyphenyl)-hexafluoropropane] (poly(6FDA-BTDA-APAF)), poly[4,4'-oxydiphthalic anhydride-2,2-bis(3-amino-4-hydroxyphenyl)-hexafluoropropane-3,3'-dihydroxy-4,4'-diamino-biphenyl] (poly(ODPA-APAF-HAB)), poly[3,3',4,4'-benzophenonetetracarboxylic dianhydride-2,2-bis(3-amino-4-hydroxyphenyl)-hexafluoropropane-3,3'-dihydroxy-4,4'-diamino-biphenyl] (poly(BTDA-APAF-HAB)), and poly(4,4'-bisphenol A dianhydride-3,3',4,4'-benzophenonetetracarboxylic dianhydride-2,2-bis(3-amino-4-hydroxyphenyl)-hexafluoropropane] (poly(BPADA-BTDA-APAF)).

The both hydroxy- and UV cross-linkable functional group-containing polyimide polymers that are used for the preparation of the cross-linked polybenzoxazole-type of membrane as the pre-membrane and secondary membrane in the multi-stage membrane process in the present invention are synthesized from diamines and dianhydrides in polar solvents such as 1-methyl-2-pyrrolidione (NMP) or N,N-dimethylacetamide (DMAc) by a two-step process involving the formation of the poly(amic acid)s followed by a solution imidization or a thermal imidization. Acetic anhydride is used as the dehydrating agent and pyridine (or triethylamine) is used as the imidization catalyst for the solution imidization reaction.

The polyimide membrane that is used for the preparation of the cross-linked polybenzoxazole-type of membrane in the present invention can be fabricated into a thin film composite membrane from the both hydroxy- and UV cross-linkable functional group-containing polyimide polymer by casting a homogeneous polyimide solution on top of a clean glass plate and allowing the solvent to evaporate slowly inside a plastic cover for at least 12 hours at room temperature. The membrane is then detached from the glass plate and dried at room temperature for 24 hours and then at 200° C. for at least 48 hours under vacuum.

The solvents used for dissolving the polyimide polymer are chosen primarily for their ability to completely dissolve the polymers and for ease of solvent removal in the membrane formation steps. Other considerations in the selection of solvents include low toxicity, low corrosive activity, low environmental hazard potential, availability and cost. Representative solvents for use in this invention include most amide solvents that are typically used for the formation of polymeric membranes, such as such as N-methylpyrrolidone (NMP) and N,N-dimethyl acetamide (DMAC), methylene chloride, tetrahydrofuran (THF), acetone, N,N-dimethylformamide (DMF), dimethyl sulfoxide (DMSO), toluene, dioxanes, 1,3-dioxolane, mixtures thereof, and mixtures thereof. Other solvents as known to those skilled in the art may also be used.

The polyimide membrane that is used for the preparation of the cross-linked polybenzoxazole-type of membrane in the present invention can also be fabricated by a method comprising the steps of dissolving the polyimide polymer in a solvent to form a solution of the polyimide material, contacting a porous membrane support (e.g., a support made from inorganic ceramic material) with this solution and evaporating the solvent to provide a thin selective layer comprising the polyimide polymer material on the supporting layer.

The polyimide membrane that is used for the preparation of the cross-linked polybenzoxazole-type of membrane in the present invention can also be fabricated as an asymmetric membrane with flat sheet or hollow fiber geometry by phase inversion followed by direct air drying through the use of at least one drying agent which is a hydrophobic organic compound such as a hydrocarbon or an ether (see U.S. Pat. No. 4,855,048). The polyimide membrane can also be fabricated as an asymmetric membrane with flat sheet or hollow fiber geometry by phase inversion followed by solvent exchange methods (see U.S. Pat. No. 3,133,132).

The both hydroxy- and UV cross-linkable functional group-containing polyimide membrane is then converted to polybenzoxazole polymer membrane by heating between 250 and 600° C. under inert atmosphere such as nitrogen or vacuum. The cross-linked polybenzoxazole polymer membrane is then formed by UV-cross-linking the polybenzoxazole polymer membrane using a UV lamp from a distance and for a period of time selected based upon the separation properties sought. For example, the cross-linked polybenzoxazole polymer membrane can be prepared from polybenzoxazole polymer membrane by exposure to UV radiation using 254 nm wavelength UV light generated from a UV lamp with 1.9 cm (0.75 inch) distance from the membrane surface to the UV lamp and a radiation time of 30 min at less than 50° C. The UV lamp described here is a low pressure, mercury arc immersion UV quartz 12 watt lamp with 12 watt power supply from Ace Glass Incorporated. Optimization of the cross-linking degree in the cross-linked polybenzoxazole polymer membrane should promote the tailoring of the membranes as the primary stage membrane in a multi stage membrane process for a wide range of gas, vapor, and liquid separations with improved permeation properties and environmental stability. The cross-linking degree of the cross-linked polybenzoxazole polymer membrane can be controlled by adjusting the distance between the UV lamp and the membrane surface, UV radiation time, wavelength and strength of UV light, etc. Preferably, the distance from the UV lamp to the membrane surface is in the range of 0.8 to 25.4 cm (0.3 to 10 inches) with a UV light provided from 12 watt to 450 watt low pressure or medium pressure mercury arc lamp, and the UV radiation time is in the range of 0.5 min to 1 hour. More preferably, the distance from the UV lamp to the membrane surface is in the range of 1.3 to 5.1 cm (0.5 to 2 inches) with a UV light provided from 12 watt to 450 watt low pressure or medium pressure mercury arc lamp, and the UV radiation time is in the range of 0.5 to 40 minutes.

In some cases a membrane post-treatment step can be added after the formation of the cross-linked polybenzoxazole polymer membrane with a thin layer of high permeability material such as a polysiloxane, a fluoro-polymer, a thermally curable silicone rubber, or a UV radiation curable epoxy silicone deposited on the membrane surface. The coating fills the surface pores and other imperfections comprising voids (see U.S. Pat. Nos. 4,230,463; 4,877,528; 6,368,382).

The new cross-linked polybenzoxazole polymer membranes as the pre-membrane and secondary membrane in the multi-stage membrane process in the present invention can have either a nonporous symmetric structure or an asymmetric structure with a thin nonporous dense selective layer supported on top of a porous support layer. The porous support can be made from the same cross-linked polybenzoxazole polymer material or a different type of material with high thermal stability. The new cross-linked polybenzoxazole polymer membranes used as the pre-membrane and secondary membrane in the multi-stage membrane process in the present invention can be fabricated into any convenient geometry such as flat sheet (or spiral wound), tube, disk, hollow fiber, or thin film composite.

The new type of cross-linked polybenzoxazole polymer membrane used as the pre-membrane and secondary membrane in the multi-stage membrane process in the present invention has the following properties/advantages: ease of processability, both high selectivity and high permeation rate or flux, high thermal stability, and stable flux and sustained selectivity over time by resistance to solvent swelling, plasticization and hydrocarbon contaminants.

DETAILED DESCRIPTION OF THE DRAWINGS

Figure 2:
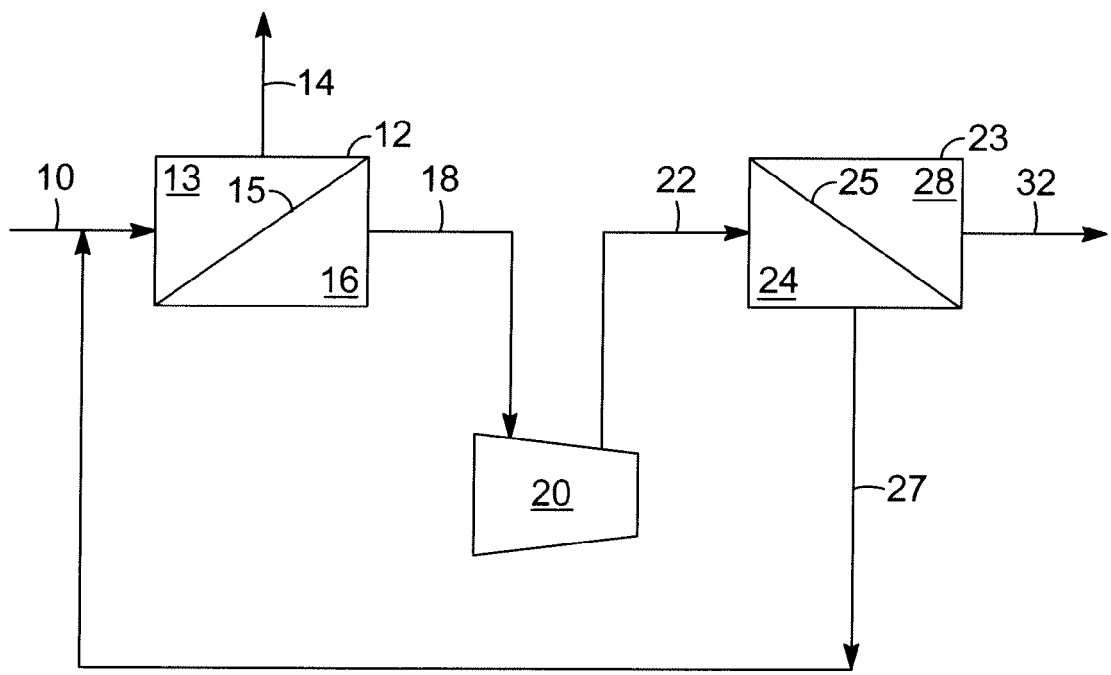
FIG. 2 shows a conventional two stage-membrane system with the permeate as the product.

Two variations of a conventional two-stage membrane system are shown in FIGS. 1 and 2. In FIG. 1, the retentate is the desired product. In order to increase the product recovery, permeate from the primary membrane is compressed and sent to the secondary membrane. Only the permeate from the secondary membrane is withdrawn as the waste stream. The residue from the secondary membrane is recycled to the primary membrane to recover more products. In FIG. 2, the permeate contains the desired product. In this configuration, the two-stage membrane is used to increase both the product purity and its recovery.

More specifically, FIG. 1 shows a conventional two-stage membrane system 1 (with retentate as product) with a feed 10 being shown entering primary membrane unit 12. Retentate stream is shown on side 13 of a membrane 15 and permeate stream is shown on side 16. The retentate stream is the product in FIG. 1 and a stream of product gas is shown exiting at 14. Permeate stream 18 which has a higher concentration of waste gases or liquids than that of feed 10 is compressed in compressor 20 and compressed permeate stream 22 now enters secondary membrane unit 23. Secondary membrane unit 23 has a retentate side 24 of membrane 25 and a permeate side 28. Retentate stream 26, which has a higher concentration in the desired product than that of the compressed permeate stream 22 is returned to feed stream 10 and permeate waste stream 30 with a higher concentration of waste gases or liquids exits conventional two-stage membrane system 1.

Conventional two-stage membrane system 2 (with permeate as product) is shown in FIG. 2 with a feed 10 being shown entering primary membrane unit 12. Retentate stream is shown on side 13 of a membrane 15 and permeate stream is shown on side 16. The permeate stream is the product in FIG. 2 and a stream mostly comprising waste gases or liquids is shown exiting at 14. Permeate stream 18 which has a higher concentration of product than that of feed 10 is compressed in compressor 20 and compressed permeate stream 22 now enters secondary membrane unit 23. Secondary membrane unit 23 has a retentate side 24 of membrane 25 and a permeate side 28. Retentate stream 27, which has a higher concentration of waste gases or liquids than that of the compressed permeate gas stream 22 is returned to feed stream 10 to remove waste by primary membrane unit 12 and product stream 32 with a higher concentration of product exits conventional two-stage membrane system 2.

Figure 3:
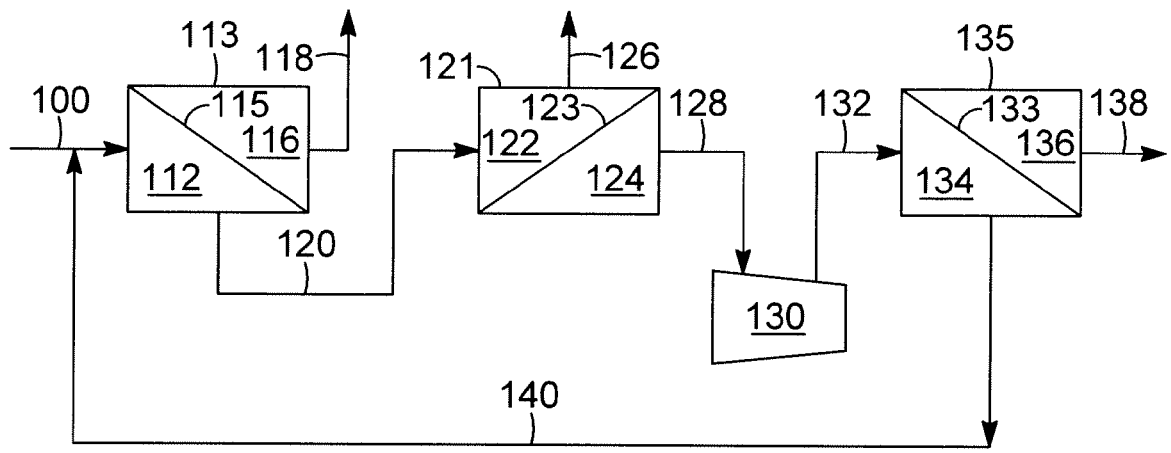
FIG. 3 shows a multi-stage membrane system of the present invention with the retentate as the product.
Figure 4:
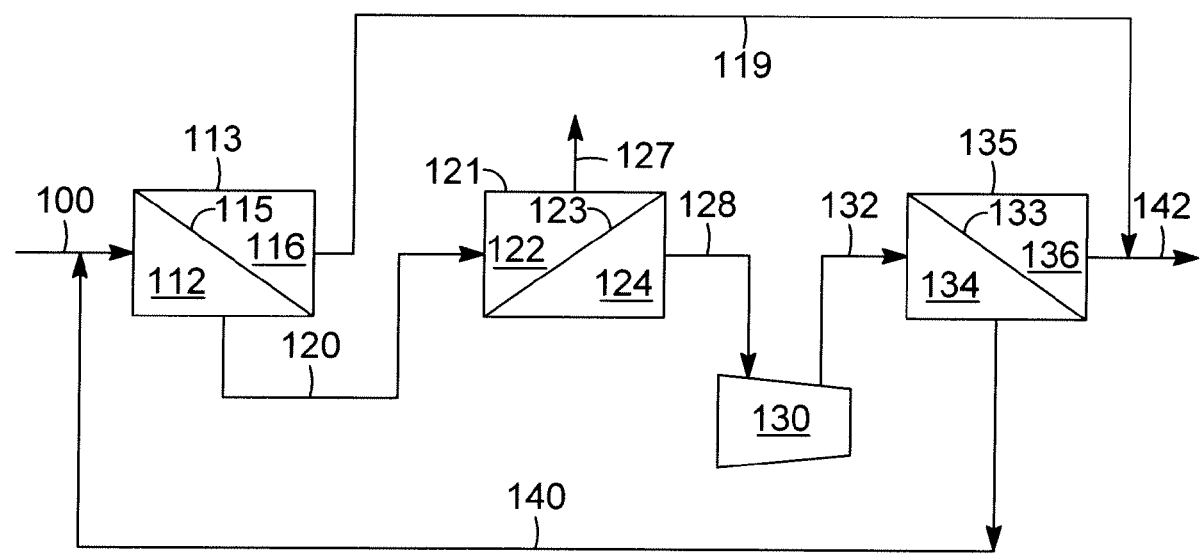
FIG. 4 shows a multi-stage membrane system of the present invention with the permeate as the product.

The membrane systems for this invention are shown in FIGS. 3 and 4. In FIG. 3, a pre-membrane with both high selectivity and high permeance or at least high selectivity membrane materials is used. The membrane materials for the pre-membrane are polybenzoxazole polymers or cross-linked polybenzoxazole polymers. Since the selectivity is very high, the permeate from the pre-membrane has a low concentration of the desired product components. This permeate can be directly withdrawn as the waste stream without further processing. The system as shown in FIG. 3 can significantly reduce the inter-stage compression cost compared to the conventional process configuration shown in FIG. 1. The primary membrane in FIG. 3 is fabricated from a low cost glassy polymer. The secondary membrane can be either the same or another low cost glassy polymer membrane or a high selectivity polybenzoxazole polymer or cross-linked polybenzoxazole polymer membrane. If the high selectivity membrane is applied as the secondary membrane, the product recovery can be increased. FIG. 4 shows a process where the permeate is the desired product, and the product purity is very important to the application. This process also uses a high selectivity pre-membrane and a possible high selectivity secondary membrane. The permeate from the pre-membrane can be sent to a product stream without further treatment. The membrane system in FIG. 4 can significantly reduce the inter-stage compression cost compared to the conventional system shown in FIG. 2 that does not include the pre-membrane.

More specifically, FIG. 3 shows a multi-stage membrane system 3 (with retentate as product). A feed 100 is shown entering a pre-membrane unit 113 having a retentate side 112 and a permeate side 116 of membrane 115. A permeate waste stream is seen exiting at 118. A retentate stream 120 that is higher in concentration of product than feed 100 is seen entering primary membrane unit 121. Retentate stream is shown on side 122 of a membrane 123 and permeate stream is shown on side 124. The retentate stream is seen exiting as product stream 126 and permeate stream 128 is higher in waste gases or liquids than product stream 126. Permeate stream 128 is compressed in compressor 130 and compressed permeate stream 132 now enters secondary membrane unit 135. Secondary membrane unit 135 has a retentate side 134 of membrane 133 and a permeate side 136. Stream 140, which has a higher concentration of product gases or liquids than that of compressed permeate stream 132 is returned to feed stream 100 to recover more product by primary membrane unit 121 and permeate waste stream 138 with a higher concentration of waste exits multi-stage membrane system 3. In a variation of the system shown in FIG. 3, stream 140 can also be returned to stream 120 as the feed for primary membrane unit 121.

More specifically, FIG. 4 shows a multi-stage membrane system 4 (with permeate as product). A feed 100 is shown entering a pre-membrane unit 113 having a retentate side 112 and a permeate side 116 of membrane 115. A product stream is seen exiting at 119 to be added to the other portion of the product at 142. A retentate stream 120 that is higher in concentration of waste gases or liquids than feed 100 is seen entering primary membrane unit 121. Retentate stream is shown on side 122 of a membrane 123 and permeate gas is shown on side 124. The retentate stream is seen exiting as waste stream 127 and permeate stream 128 is higher in product than retentate stream 120. Permeate stream 128 is compressed in compressor 130 and compressed permeate stream 132 now enters secondary membrane unit 135. Secondary membrane unit 135 has a retentate side 134 of membrane 133 and a permeate side 136. Stream 140, which has a higher concentration of waste gases or liquids than that of the compressed permeate stream 132 is returned to feed stream 100 to remove waste by primary membrane unit 121 and product 142 with a higher concentration of product exits multi-stage membrane system 4. In a variation of the system shown in FIG. 4, stream 140 can also be returned to stream 120 as the feed for primary membrane unit 121.

It is preferred that the membrane used as the primary membrane or both the primary and the secondary membranes in the multi-stage membrane system of the present invention is fabricated from a low cost glassy polymer with a high glass transition temperature (Tg). It is also preferred that the membrane used as a primary membrane or both the primary and secondary membrane in the multi stage membrane system of the present invention exhibits a desired product component selectivity at least 8, more preferably at least 10 at the operating conditions.

The polymer used for the preparation of the membrane that is used as the primary membrane or both the primary and the secondary membranes in the multi-stage membrane process of the present invention can be selected from, but is not limited to, polysulfones; sulfonated polysulfones; polyetherimides such as Ultem (or Ultem 1000) sold under the trademark Ultem®, manufactured by GE Plastics; cellulosic polymers, such as cellulose acetate and cellulose triacetate; polyamides; polyimides such as Matrimid sold under the trademark Matrimid® by Huntsman Advanced Materials (Matrimid® 5218 refers to a particular polyimide polymer sold under the trademark Matrimid®) and P84 or P84HT sold under the tradename P84 and P84HT respectively from HP Polymers GmbH; polyamide/imides; polyketones, polyether ketones; poly(arylene oxides) such as poly(phenylene oxide) and poly(xylene oxide); poly(esteramide-diisocyanate); polyurethanes; polyesters (including polyarylates), such as poly(ethylene terephthalate), poly(alkyl methacrylates), poly(acrylates), and poly(phenylene terephthalate); polysulfides; polymers from monomers having alpha-olefinic unsaturation in addition to those polymers previously listed including poly(ethylene), poly(propylene), poly(butene-1), poly(4-methyl pentene-1), polyvinyls, e.g., poly(vinyl chloride), poly(vinyl fluoride), poly(vinylidene chloride), poly(vinylidene fluoride), poly(vinyl alcohol), poly(vinyl esters) such as poly(vinyl acetate) and poly(vinyl propionate), poly(vinyl pyridines), poly(vinyl pyrrolidones), poly(vinyl ethers), poly(vinyl ketones), poly(vinyl aldehydes) such as poly(vinyl formal) and poly(vinyl butyral), poly(vinyl amides), poly(vinyl amines), poly(vinyl urethanes), poly(vinyl ureas), poly(vinyl phosphates), and poly(vinyl sulfates); polyallyls; poly(benzobenzimidazole); polyhydrazides; polyoxadiazoles; polytriazoles; poly (benzimidazole); polycarbodiimides; polyphosphazines; microporous polymers; and interpolymers, including block interpolymers containing repeating units from the above polymers such as interpolymers of acrylonitrile-vinyl bromide-sodium salt of para-sulfophenylmethallyl ethers; and grafts and blends containing any of the foregoing polymers. Typical substituents providing substituted polymers include halogens such as fluorine, chlorine and bromine; hydroxyl groups; lower alkyl groups; lower alkoxy groups; monocyclic aryl; and lower acryl groups.

Some preferred polymers used for the preparation of the membranes that are used as the primary membrane or both the primary and the secondary membranes in the multi-stage membrane process of the present invention include, but are not limited to, polysulfones, sulfonated polysulfones, polyetherimides such as Ultem (or Ultem 1000) sold under the trademark Ultem®, manufactured by GE Plastics, and available from GE Polymerland, cellulosic polymers such as cellulose acetate and cellulose triacetate, polyamides; polyimides such as Matrimid sold under the trademark Matrimid® by Huntsman Advanced Materials (Matrimid® 5218 refers to a particular polyimide polymer sold under the trademark Matrimid®), P84 or P84HT sold under the tradename P84 and P84HT respectively from HP Polymers GmbH, poly(3,3',4,4'-benzophenone tetracarboxylic dianhydride-pyromellitic dianhydride-3,3',5,5'-tetramethyl-4,4'-methylene dianiline) (poly(BTDA-PMDA-TMMDA)), poly(3,3',4,4'-benzophenone tetracarboxylic dianhydride-pyromellitic dianhydride-4,4'-oxydiphthalic anhydride-3,3',5,5'-tetramethyl-4,4'-methylene dianiline) (poly(BTDA-PMDA-ODPA-TMMDA)), poly(3,3',4,4'-diphenylsulfone tetracarboxylic dianhydride-3,3',5,5'-tetramethyl-4,4'-methylene dianiline) (poly(DSDA-TMMDA)), poly(3,3',4,4'-benzophenone tetracarboxylic dianhydride-3,3',5,5'-tetramethyl-4,4'-methylene dianiline) (poly(BTDA-TMMDA)), poly(3,3',4,4'-diphenylsulfone tetracarboxylic dianhydride-pyromellitic dianhydride-3,3',5,5'-tetramethyl-4,4'-methylene dianiline) (poly (DSDA-PMDA-TMMDA)), poly[2,2'-bis-(3,4-dicarboxyphenyl)hexafluoropropane dianhydride-1,3-phenylenediamine] (poly(6FDA-m-PDA)), poly[2,2'-bis-(3,4-dicarboxyphenyl)hexafluoropropane dianhydride-1,3-phenylenediamine-3,5-diaminobenzoic acid)] (poly(6FDA-m-PDA-DABA)); polyamide/imides; polyketones, polyether ketones; and microporous polymers.

The most preferred polymers used for the preparation of the membranes that are used as the primary membrane or both the primary and the secondary membranes in the multi-stage membrane process of the present invention include, but are not limited to, polyimides such as Matrimid®, P84®, poly (BTDA-PMDA-TMMDA), poly(BTDA-PMDA-ODPA-TMMDA), poly(DSDA-TMMDA), poly(BTDA-TMMDA), or poly(DSDA-PMDA-TMMDA), polyetherimides such as Ultem®, polysulfones, cellulose acetate, cellulose triacetate, and microporous polymers.

EXAMPLES

The following examples are provided to illustrate one or more preferred embodiments of the invention, but are not limited embodiments thereof. Numerous variations can be made to the following examples that lie within the scope of the invention.

Example 1

Preparation of Polybenzoxazole Polymer Membrane from Poly(BTDA-APAF) Polyimide Membrane (Abbreviated as PBO(BTDA-APAF-450C))

A PBO(BTDA-APAF-450C) polybenzoxazole membrane was prepared from a hydroxy-containing polyimide (poly[3,3',4,4'-benzophenonetetracarboxylic dianhydride-2,2-bis(3-amino-4-hydroxyphenyl)-hexafluoropropane] (poly(BTDA-APAF)) membrane via high temperature heat treatment at 450° C. for 1 hour in $N_2$. The poly(BTDA-APAF) polyimide polymer was synthesized from solution condensation of 2,2-bis(3-amino-4-hydroxyphenyl)-hexafluoropropane diamine monomer (APAF) and 3,3',4,4'-benzophenonetetracarboxylic dianhydride monomer (BTDA).

Example 2

Preparation of Cross-Linked Polybenzoxazole Polymer Membrane from PBO(BTDA-APAF-450C) Membrane (Abbreviated as Cross-Linked PBO (BTDA-APAF))

The cross-linked PBO(BTDA-APAF-450C) polymer membrane was prepared by further UV cross-linking the PBO(BTDA-APAF-450C) polymer membrane by exposure to UV radiation using 254 nm wavelength UV light generated from a UV lamp with 1.9 cm (0.75 inch) distance from the membrane surface to the UV lamp and a radiation time of 20 min at 50° C. The UV lamp described here is a low pressure, mercury arc immersion UV quartz 12 watt lamp with 12 watt power supply from Ace Glass Incorporated.

Example 3

$CO_2/CH_4$ Separation Performance of PBO(BTDA-APAF-450C) and Cross-Linked PBO(BTDA-APAF-450C) Polymer Membranes The PBO(BTDA-APAF-450C) and the cross-linked PBO (BTDA-APAF-450C) polymer membranes were tested for $CO_2/CH_4$ separation under testing temperatures of 50° C. and 100° C., respectively (Table 1). It can be seen from Table 1 that the PBO(BTDA-APAF-450C) polymer membrane showed high $CO_2$ permeability ($P_{CO2}$=535.9 Barrer at 50° C. testing temperature) and moderate $CO_2/CH_4$ selectivity (26.0 at 50° C. testing temperature). After cross-linking, the cross-linked PBO(BTDA-APAF-450C) polymer membrane showed significantly increased $CO_2/CH_4$ selectivity (48.4 at 50° C. testing temperature) compared to the PBO(BTDA-APAF-450C) membrane at both 50° C. and 100° C. testing temperature.

TABLE 1

Pure gas permeation test results of PBO(BTDA-APAF-450C) and the cross-linked PBO(BTDA-APAF-450C) polymer membranes for $CO_2/CH_4$ Separation

| Membrane | $P_{CO2}$ (Barrer) | $\alpha_{CO2/CH4}$ |
|---|---|---|
| PBO(BTDA-APAF-450C)[a] | 535.9 | 26.0 |
| PBO(BTDA-APAF-450C)[b] | 477.7 | 12.1 |
| cross-linked PBO(BTDA-APAF-450C)[a] | 219.5 | 48.4 |
| cross-linked PBO(BTDA-APAF-450C)[b] | 325.3 | 19.7 |

[a]$P_{CO2}$ and $P_{CH4}$ were tested at 50° C. and 690 kPa (100 psig);
[b]$P_{CO2}$ and $P_{CH4}$ were tested at 100° C. and 690 kPa (100 psig);
1 Barrer = $10^{-10}$ cm$^3$(STP) · cm/cm$^2$ · sec · cmHg.

Example 4

Preparation of Polybenzoxazole Polymer Membrane from Poly(BTDA-APAF) Polyimide Membrane (Abbreviated as PBO(BTDA-APAF-350C))

The PBO(BTDA-APAF-350C) polybenzoxazole membrane was prepared from the hydroxy-containing polyimide (poly[3,3',4,4'-benzophenonetetracarboxylic dianhydride-2,2-bis(3-amino-4-hydroxyphenyl)-hexafluoropropane] (poly (BTDA-APAF)) membrane made in Example 2 via heat treatment at 350° C. for 2 hours in $N_2$.

Example 5

Preparation of Cross-Linked Polybenzoxazole Polymer Membrane from PBO(BTDA-APAF-350C) membrane (Abbreviated as Cross-Linked PBO (BTDA-APAF-350C))

The cross-linked PBO(BTDA-APAF-350C) polymer membrane was prepared by further UV cross-linking the PBO(BTDA-APAF-350C) polymer membrane by exposure to UV radiation using 254 nm wavelength UV light generated from a UV lamp with 1.9 cm (0.75 inch) distance from the membrane surface to the UV lamp and a radiation time of 20 min at 50° C. The UV lamp described here is a low pressure, mercury arc immersion UV quartz 12 watt lamp with 12 watt power supply from Ace Glass Incorporated.

Example 6

$CO_2/CH_4$ Separation Performance of PBO(BTDA-APAF-350C) and Cross-Linked PBO(BTDA-APAF-350C) Polymer Membranes The PBO(BTDA-APAF-350C) and the cross-linked PBO (BTDA-APAF-350C) polymer membranes were tested for $CO_2/CH_4$ separation at 50° C. testing temperature and 100 psig pure $CO_2$ and $CH_4$ gas testing pressure (Table 2). It can be seen from Table 2 that the PBO(BTDA-APAF-350C) polymer membrane showed $CO_2$ permeability ($P_{CO2}$) of 11.9 Barrer and $CO_2/CH_4$ selectivity ($CO_2/CH_4$) of 35.3. After cross-linking, the cross-linked PBO(BTDA-APAF-350C) polymer membrane showed significantly increased $CO_2/CH_4$ selectivity (46.8) without significant loss in $CO_2$ permeability compared to the PBO(BTDA-APAF-350C) membrane.

TABLE 2

Pure gas permeation test results of PBO(BTDA-APAF-350C) and the cross-linked PBO(BTDA-APAF-350C) polymer membranes for $CO_2/CH_4$ Separation

| Membrane | $P_{CO2}$ (Barrer) | $\alpha_{CO2/CH4}$ |
|---|---|---|
| PBO(BTDA-APAF-350C)$^a$ | 11.9 | 35.3 |
| cross-linked PBO(BTDA-APAF-350C)$^a$ | 11.2 | 46.8 |

$^a P_{CO2}$ and $P_{CH4}$ were tested at 50° C. and 690 kPa (100 psig);
1 Barrer = $10^{-10}$ cm$^3$(STP) · cm/cm$^2$ · sec · cmHg.

Example 7

$H_2/CH_4$ Separation Performance of Cross-Linked PBO(BTDA-APAF-350C) Polymer Membrane The cross-linked PBO(BTDA-APAF-350C) polymer membrane was tested for $H_2/CH_4$ separation at 50° C. testing temperature and 100 psig pure $H_2$ and $CH_4$ gas testing pressure (Table 3). It can be seen from Table 3 that the cross-linked PBO(BTDA-APAF-350C) polymer membrane showed both high $H_2$ permeability ($P_{H2}$=54.7 Barrer and high $H_2/CH_4$ selectivity ($\alpha_{H2/CH4}$=228). These results suggest that this new cross-linked PBO(BTDA-APAF-350C) polymer membrane is a good candidate membrane for $H_2/CH_4$ separation application.

TABLE 3

Pure gas permeation test results of cross-linked PBO (BTDA-APAF-350C) polymer membrane for $H_2/CH_4$ Separation

| Membrane | $P_{H2}$ (Barrer) | $\alpha_{H2/CH4}$ |
|---|---|---|
| cross-linked PBO(BTDA-APAF-350C)$^a$ | 54.7 | 228.0 |

$^a P_{H2}$ and $P_{CH4}$ were tested at 50° C. and 690 kPa (100 psig);
1 Barrer = $10^{-10}$ cm$^3$(STP) · cm/cm$^2$ · sec · cmHg.

COMPARABLE EXAMPLES

Six process simulation examples were studied to compare the multi-stage membrane system proposed in this invention with the conventional multi-stage membrane system. Comparable Example 1 was a conventional two-stage membrane system using the currently commercially available membranes to remove $CO_2$ from natural gas. The process flow scheme is shown in FIG. 1. Comparable Example 2 simulated the process shown in FIG. 3 using the cross-linked high selectivity PBO polymer listed in TABLE 2 as the material to make the pre-membranes. Comparable Example 3 was the same as Comparable Example 2 except that the secondary membranes in Comparable Example 3 were made from the cross-linked high selectivity PBO polymer listed in TABLE 2.

Comparable Example 4 shows a two-stage membrane system for hydrogen purification using the commercially available lower selectivity membranes in both stages. The process flow scheme for Comparable Example 4 is shown in FIG. 2. In Comparable Example 5, the cross-linked high selectivity PBO membranes shown in TABLE 3 were used as the pre-membranes. Comparable Example 6 is the same as Comparable Example 5 except that the secondary membranes in Comparable Example 6 were made from the cross-linked high selectivity PBO polymer listed in TABLE 3. The process flow scheme for Comparable Examples 5 and 6 is shown in FIG. 4.

Comparable Examples 1, 2, and 3 were for $CO_2$ removal from natural gas. In these examples, a fresh natural gas feed with 60% $CO_2$ and the product spec for $CO_2$ at 8% were assumed. In Comparable Examples 1, 2, and 3, the commercially available membrane (for the primary membrane and the secondary membrane) was assumed to be a membrane with typical performance in the current natural gas upgrading market. In Comparable Examples 2 and 3, the cross-linked PBO (shown in TABLE 2) material was assumed to make the membranes with a skin layer thickness of 75 nm. The permeance of the new cross-linked PBO membrane (used as the pre-membrane in Comparable Example 2, and as pre-membrane and secondary membrane in Comparable Example 3) was assumed at 0.00409 m$^3$ (STP)/m$^2$·h·kPa based on the permeability measured for the dense film shown in TABLE 2, and the selectivity was assumed at 40 at 50°, which is lower than the selectivity of a dense film shown in TABLE 2. A process simulation based on the above performance was performed for Comparable Examples 1, 2 and 3. The results are shown in TABLE 4.

TABLE 4

Simulation Results for Comparable Examples 1, 2 and 3

|  | Comparable Example 1 | Comparable Example 2 | Comparable Example 3 |
|---|---|---|---|
| Feed Flow, m³(STP)/h | $5.9 \times 10^5$ | $5.9 \times 10^5$ | $5.9 \times 10^5$ |
| $CO_2$ in Feed, % | 60 | 60 | 60 |
| $CO_2$ in Product Required, % | 8 | 8 | 8 |
| Membrane Feed Temperature, C. | 50 | 50 | 50 |
| Membrane Feed Pressure, KPa | 3792.3 | 3792.3 | 3792.3 |
| Total Membrane Area, % | Base | 97.6 | 105.6 |
| Pre-Membrane Area as Percentage of Total Membrane Area, % | NA | 28.2 | 26.0 |
| Secondary Membrane Area as Percentage of Total Membrane Area, % | 23.0 | 12.5 | 18.3 |
| Compressor Power Change, % | Base | −38.2 | −36.8 |
| Total Hydrocarbon Recovery, % | 95.8 | 95.8 | 97.0 |

Comparing the above examples, Comparable Examples 2 and 3 demonstrated significant compression cost saving. In Comparable Example 2, the compressor power reduced 38.2% compared to the base case which is the Comparable Example 1. The compressor power reduced 36.8% for Comparable Example 3. The total membrane area used for the above three examples did not change much, with Comparable Example 2 slightly lower and Comparable Example 3 slightly higher. Due to the higher selectivity of the secondary membrane in Comparable Example 3, the hydrocarbon recovery increased from 95.8% of the Comparable Examples 1 and 2 to 97%. TABLE 4 shows that the area of the pre-membrane and the secondary membrane is relatively small compared to the primary membrane. Hence, the cost of the membrane system will not increase much even the higher cost cross-linked PBO (shown in TABLE 2) material is used to make the pre-membranes and secondary membranes.

Comparable Examples 4, 5, and 6 were for hydrogen purification. In these examples, a fresh hydrocarbon and hydrogen feed with 70% hydrogen was assumed. The product spec of the hydrogen stream was 95% minimal hydrogen purity. In Comparable Examples 4, the commercially available membrane (for the primary membrane and the secondary membrane) was assumed to be a membrane with typical performance as the current commercially available hydrogen membrane. In Comparable Examples 5 and 6, the cross-linked PBO (shown in TABLE 3) material was assumed to make the membranes with a skin layer thickness of 150 nm. The permeance of the new cross-linked PBO membrane (used as the pre-membrane in Comparable Example 5, and as the pre-membrane and the secondary membrane in Comparable Example 6) was assumed at 0.01 m³ (STP)/m²·h·kPa based on the permeability measured for the dense film shown in TABLE 3, and the selectivity was assumed at 220 at 50° C., which is lower than the selectivity of a dense film shown in TABLE 3. A process simulation based on the above performance was performed for Comparable Examples 4, 5 and 6. The results are shown in TABLE 5.

TABLE 5

Simulation Results for Comparable Examples 4, 5, and 6

|  | Comparable Example 4 | Comparable Example 5 | Comparable Example 6 |
|---|---|---|---|
| Feed Flow, m³(STP)/h | $5.9 \times 10^5$ | $5.9 \times 10^5$ | $5.9 \times 10^5$ |
| $H_2$ in Feed, % | 70 | 70 | 70 |
| Product Hydrogen Purity, % | 95.0 | 95.0 | 96.6 |
| Membrane Feed Temperature, C. | 50 | 50 | 50 |
| Membrane Feed Pressure, KPa | 5516 | 5516 | 5516 |
| Total Membrane Area, % | Base | 117.3 | 121.6 |
| Pre-Membrane Area as Percentage of Total Membrane Area, % | NA | 31.2 | 31.6 |
| Secondary Membrane Area as Percentage of Total Membrane Area, % | 44.1 | 23.6 | 22.8 |
| Compressor Power Change, % | Base | −30.1 | −26.8 |

It can be seen from the above table that Comparable Example 5 and Comparable Example 6 can save 30.1% and 26.8% of the compression cost compared to Comparable Example 4 due to the usage of high selectivity membrane in the pre-membrane. However, the membrane area increase is larger than that of the natural gas cases. Comparable case 5 showed a 17.3% membrane area increase while Comparable case 6 showed a 21.6% membrane area increase. Since the energy cost is high now, the low operating cost (low compression cost) will buy the extra capital (more membrane area). Comparable Example 6 shows high hydrogen purity due to the use of the high selectivity membrane materials for the secondary membrane.

The invention claimed is:

1. A process for separating a mixture of gases or liquids comprising sending said mixture of gases or liquids to a pre-membrane to separate them into a first permeate stream which passes through the pre-membrane and a first retentate stream that does not pass through the pre-membrane; sending said first retentate stream to a primary membrane to separate said first retentate stream into a second permeate stream and a second retentate stream; and then sending said second permeate stream to a secondary membrane to separate it into a third permeate stream and a third retentate stream and wherein said pre-membrane comprises a UV cross-linked polybenzoxazole membrane prepared from a polyimide represented by formula (I):

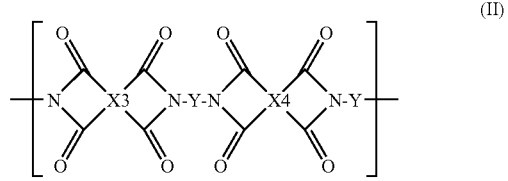

where X1 of formula (I) is

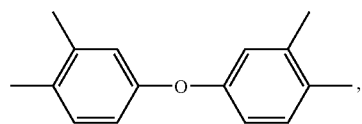

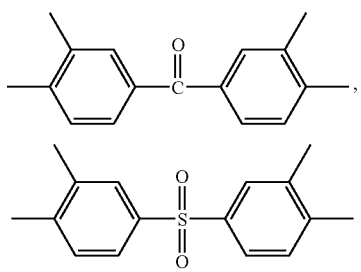

or mixtures thereof, X2 of formula (I) is either the same as X1 or is selected from

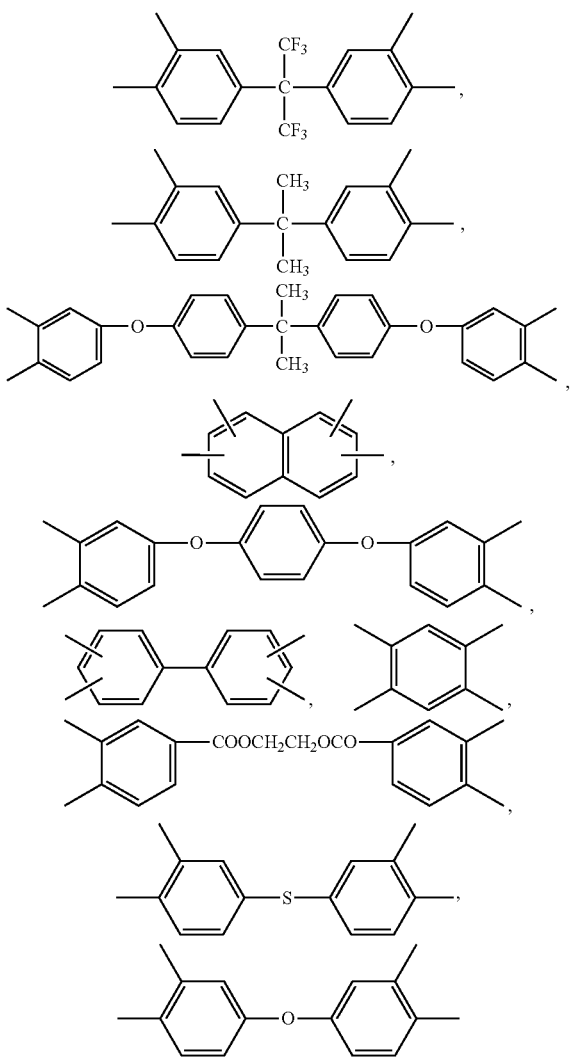

or mixtures thereof, —Y— of formula (I) is

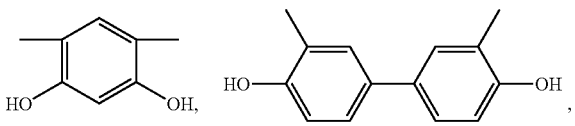

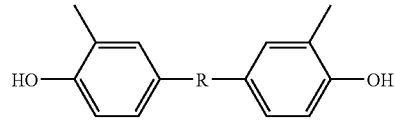

or mixtures thereof, —R— is

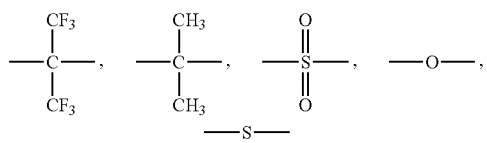

or mixtures thereof, and wherein said primary membrane comprises a membrane selected from the group consisting of cellulose acetate membrane, polyimide membrane, UV cross-linkable polybenzoxazole membrane, UV cross-linked polybenzoxazole membrane, and mixtures thereof and said secondary membrane comprises a UV cross-linkable polybenzoxazole membrane or a UV cross-linked polybenzoxazole membrane.

2. The process of claim 1 wherein said first permeate stream comprises waste gases or liquids that are removed from said pre-membrane and said first retentate stream comprises product gases or liquids.

3. The process of claim 1 wherein said first permeate stream comprises a product stream and said first retentate stream comprises waste gases or liquids.

4. The process of claim 1 wherein said second retentate stream comprises a product stream and said second permeate stream comprises waste gases or liquids.

5. The process of claim 1 wherein said second retentate stream comprises waste gases or liquids and said second permeate stream comprises product gases and liquids.

6. The process of claim 1 wherein said third permeate stream comprises a waste stream and said third retentate stream comprises product gases or liquids, which is recycled to pre-membrane and/or primary membrane.

7. The process of claim 1 wherein said third permeate stream comprises a product stream and said third retentate stream comprises waste gases or liquids, which is recycled to pre-membrane and/or primary membrane.

8. The process of claim 1 wherein said primary membrane is a UV cross-linked polybenzoxazole membrane prepared from a polyimide represented by formula (I):

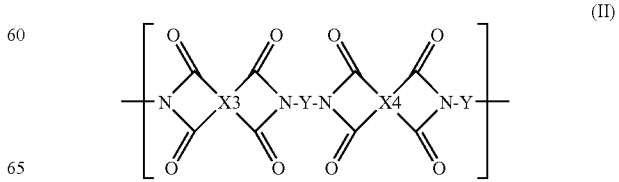

where X1 of formula (I) is

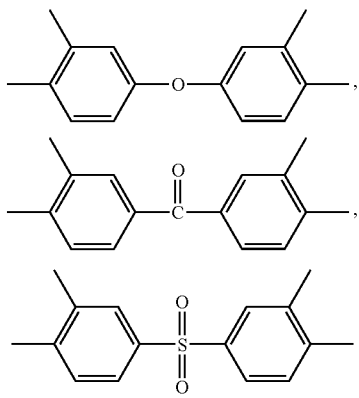

or mixtures thereof, X2 of formula (I) is either the same as X1 or is selected from

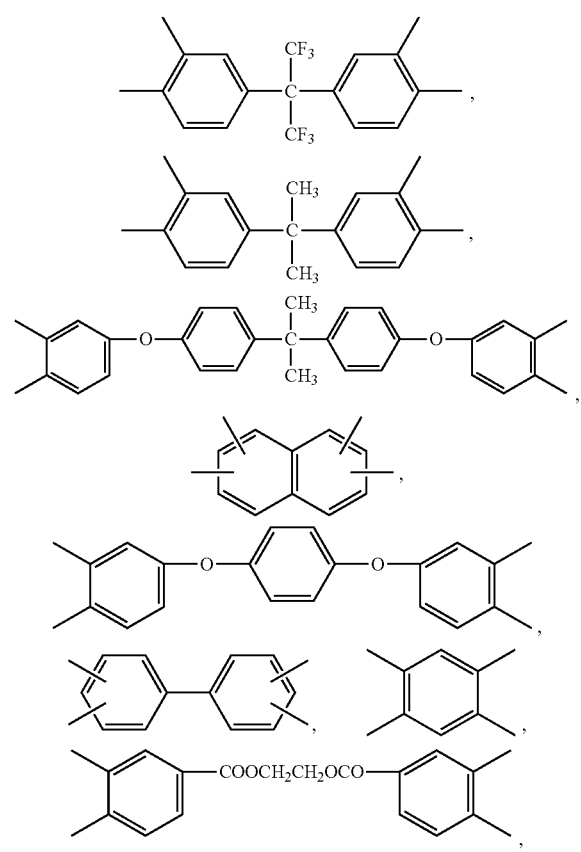

or mixtures thereof, —Y— of formula (I) is

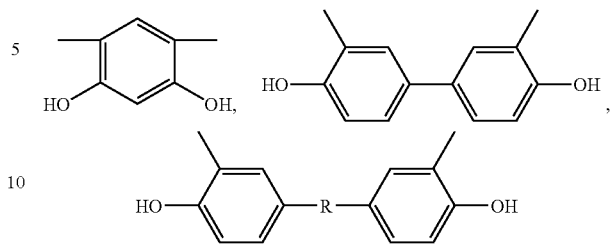

or mixtures thereof, —R— is

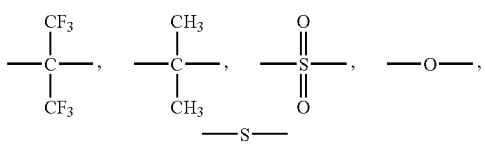

or mixtures thereof.

9. The process of claim 1 wherein secondary membrane is a UV cross-linked polybenzoxazole membrane prepared from a polyimide represented by formula (I):

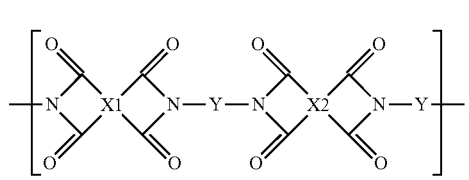

where X1 of formula (I) is

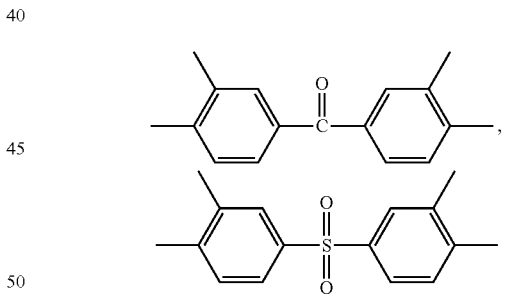

or mixtures thereof, X2 of formula (I) is either the same as X1 or is selected from

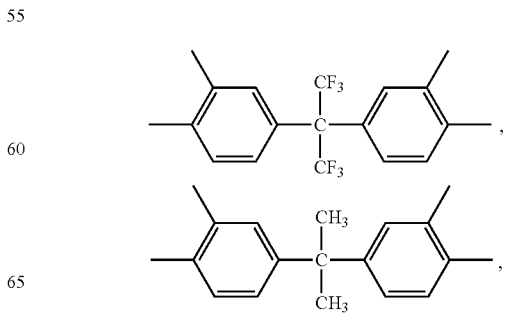

-continued
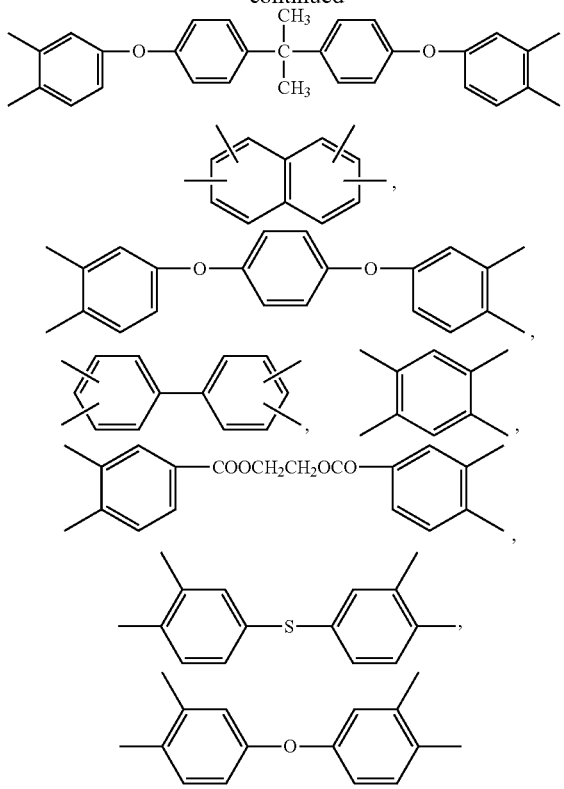
or mixtures thereof, —Y— of formula (I) is
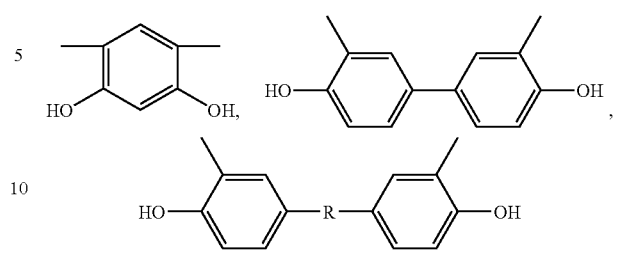
or mixtures thereof, —R— is
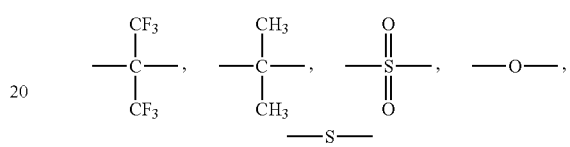
or mixtures thereof.
10. The process of claim 1 wherein said pre-membrane, said primary membrane and said secondary membrane are in a form selected from the group consisting of sheets, disks, tubes and hollow fibers.
* * * * *